United States Patent [19]
Dodd

[11] 4,388,781
[45] Jun. 21, 1983

[54] ROTARY TOOL FOR STRADDLE GRINDING

[75] Inventor: Harry D. Dodd, Rochester, N.Y.

[73] Assignee: The Gleason Works, Rochester, N.Y.

[21] Appl. No.: 304,218

[22] Filed: Sep. 21, 1981

[51] Int. Cl.³ .............................................. B23F 21/03
[52] U.S. Cl. ...................................... 51/206 R; 409/27
[58] Field of Search .......... 51/206 R, 206 NF, 206 P, 51/168, 287, 209 R, 209 S, 206.4; 409/27, 28, 29, 30, 50, 53

[56] References Cited

U.S. PATENT DOCUMENTS

| | | | |
|---|---|---|---|
| 1,079,304 | 11/1913 | Spencer | 51/209 R |
| 1,604,517 | 10/1926 | Jolls | 51/209 R |
| 1,612,371 | 11/1926 | Gleason et al. | 51/209 R |
| 2,309,016 | 1/1943 | Ryan | 51/209 R |
| 2,450,230 | 9/1948 | Bush | 51/209 R |
| 2,633,775 | 4/1953 | Wildhaber | 90/5 |
| 2,673,425 | 3/1954 | Karnell | 51/209 R |
| 2,839,873 | 6/1958 | Baxter, Jr. | 51/206 R |

FOREIGN PATENT DOCUMENTS 2721164 11/1978 Fed. Rep. of Germany .

*Primary Examiner*—James G. Smith
*Assistant Examiner*—Robert A. Rose
*Attorney, Agent, or Firm*—Ralph E. Harper; Morton A. Polster

[57] ABSTRACT

A rotary grinding tool having two concentric grinding elements projecting in a common direction from one face of the tool is assembled from basic components which can be easily disassembled to permit accurate profile correction and surface renewal of its active grinding surfaces. In addition, the disassembled components can be used as separate grinding tools.

6 Claims, 8 Drawing Figures

ROTARY TOOL FOR STRADDLE GRINDING

BACKGROUND AND BRIEF DESCRIPTION OF INVENTION

It is known to use stock-removing tools which are designed and arranged on a rotary tool body so as to straddle the tooth element of a gear type of workpiece. With this arrangement, it is possible to present two stock-removing portions of a tool to a workpiece to thereby simultaneously form or finish a single tooth of the workpiece. The two stock-removing portions are arranged in concentric circular paths so that the rotating tool can be brought into engagement with a workpiece to generate a desired tooth form or shape on the workpiece.

It is also known to use special grinding compositions for tools of the type contemplated herein, and one composition of special interest to present day technology is one that uses cubic boron nitride (CBN) as its essential stock-removing ingredient. CBN grinding wheels offer the possibility of higher metal removal rates and grinding of materials which are more difficult to machine than have been handled with prior grinding equipment and processes, but it is a known problem with CBN grinding that it is very difficult to renew the active surfaces of the CBN grinding wheels after they have been used for a sufficient length of time to deteriorate the surface profile or condition. Generally, renewal of grinding wheel surfaces involves such things as reshaping of profile of the surface, correction of its geometry, and renewal of abrasive particles contained within the surface. All of these treatments are generically referred to as "dressing" of a grinding wheel surface. Cubic boron nitride, as used in grinding wheels, is by its natural characteristics a very hard and difficult material to shape or dress. This problem is especially acute with grinding wheels which are designed to present two annular stock-removing surfaces in a side-by-side relationship on the face of a rotary tool because the active surfaces of such grinding wheels are relatively inaccessible to dressing devices. Accordingly, it is an important purpose of the present invention to provide a design of rotary tool which makes it easier to dress and renew stock-removal surfaces when the tool is formed from cubic boron nitride. However, some of the features of the tool assembly of the present invention will be found to be useful for other types of stock-removal surfaces, and therefore, the invention is not limited to only those tools which utilize CBN as a primary stock-removal composition.

In accordance with the present invention a rotary grinding tool for grinding bevel and hypoid gears and similar workpieces is characterized by an assembly of components which are arranged to permit easy disassembly and separate dressing or renewal of each of the annular grinding elements included in a tool of this type. This is accomplished by providing separate disc-shaped bodies for carrying the two annular grinding elements associated with the rotary tool. A first disc-shaped body is designed to carry an inner stock-removal element of the tool, and a second disc-shaped body is designed for carrying an outer stock-removing element of the tool. The first and second disc-shaped bodies are shaped and dimensioned to be secured together in a way which provides precise concentricity of the inner and outer stock-removing elements relative to each other. In addition, a ring member is provided around the two bodies to give added support and rigidity to the entire assembly. The basic components are secured together with releasable elements which can be easily removed so that either of the first or second annular grinding elements can be dressed and renewed in situ on their respective disc-shaped bodies by an appropriate dressing mechanism. This permits precision renewal of all critical grinding surfaces without interference with parts of the grinding wheel assembly which might otherwise be in the way of the dressing mechanism.

Another purpose of this invention is to provide for a rotary grinding tool which can be easily adjusted to operate with either one or two annular grinding elements.

In a specific embodiment of the invention, the first disc-shaped body includes a recess about its outer periphery for receiving a base portion of an annular grinding element while leaving a stock-removing surface of the element projecting outwardly from the face of the disc-shaped body. This first disc-shaped body includes a bore through its center, and a tapered section is provided in said bore for aligning, very accurately, the first disc-shaped body with a part of the second disc-shaped body which is designed to fit into that portion of the bore. Alternatively, the first disc-shaped body can be accurately mounted directly onto the tool spindle of a grinding machine. The second disc-shaped body likewise includes a bore through its center and, in addition, includes a projecting annular sleeve which is concentric with its center axis for being received into the tapered section of the bore of the first disc-shaped body. In this manner, the two basic components of the assembly can be precisely realigned and centered after a dressing operation has been completed and the components are reassembled for further use on a grinding machine.

These and other features of the invention will become apparent in the more detailed description which follows. In that description, reference will be made to the accompanying drawings as briefly described below.

DETAILED DESCRIPTION OF THE INVENTION

Figure 1:
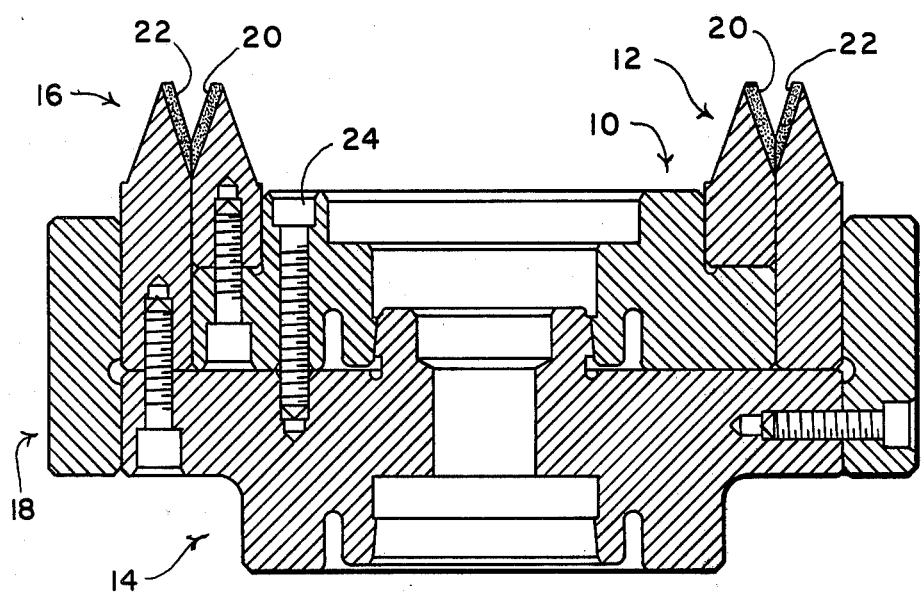
FIG. 1 is an elevational view, in section, of an assembled rotary tool in accordance with this invention.

FIG. 1 illustrates the grinding wheel assembly of this invention in a completely assembled condition for use in a straddle grinding operation. Basic components of the assembly include a first disc-shaped body 10 which carries an inner annular grinding element 12, a second disc-shaped body 14 carrying an outer annular grinding element 16, and a ring member 18 for supporting and containing the disc-shaped bodies and their respective grinding elements. Each of the annular grinding elements 12 and 16 comprise known structures which include a base portion and a shaped stock-removing portion.

The illustrated assembly is used for special grinding operations which involve the forming or finishing of gear teeth in a workpiece. In such operations, the inner grinding element 12 and the outer grinding element 16 are positioned to define opposite profile surfaces of a single tooth of a gear. Thus, the two grinding elements straddle a single tooth to be formed (see FIG. 8), and this type of operation is known as straddle grinding. It can be appreciated that the active grinding surfaces for straddle grinding involve the surface 20 of the inner grinding element 12 and the surface 22 of the outer grinding element 16. Thus, the grinding loads will tend to push the inner grinding element 12 radially inwardly while, at the same time, tending to push the outer grinding element 16 radially outwardly. For this reason, the assembly provides for substantial support for the inner circumference of the base of the inner grinding element 12 and the outer circumference of the base of the outer grinding element 16.

After the grinding wheel has been used for a period of time in a grinding operation, it is necessary to renew the active grinding surfaces 20 and 22. Since these surfaces are relatively close to one another and in a face-to-face relationship to one another, it is not possible to easily insert a dressing mechanism between the two surfaces so as to accurately renew their profiles and surface conditions. Accordingly, the invention provides for a separation of the inner grinding element 12 from the outer grinding element 16 so as to permit easier and more precise renewal of the active grinding surfaces on these elements. Separation of the grinding elements is achieved by removing the fasteners 24 that secure the first disc-shaped body 10 to the second disc-shaped body 14 and by using backoff screws that are provided for separating the two bodies. When this is done, the first disc-shaped body 10, together with its annular grinding element 12, can be removed from the grinding wheel assembly and placed on a separate spindle for accurate dressing and renewal of the profile of the active grinding surface 20 of its annular grinding element. Similarly, the second disc-shaped body 14, together with its outer grinding element 16 and ring member 18 can be placed on a spindle for accurate renewal of its active grinding surface 22. In the case of cubic boron nitride grinding wheel compositions, it is possible to use a grinding wheel of this type for a relatively long time (for example, for an entire work cycle of eight hours) before renewal of grinding surfaces is required. At the end of the work cycle, the grinding wheel can be removed from the grinding machine and the wheel components can be separated for precision profile correction and surface reconditioning. While this is being done, the grinding machine can be put back in service with a previously renewed grinding wheel, and the operation can continue without interruption. This also eliminates the need for building dressing mechanisms on the grinding machine itself and permits the use of better and more precise dressing mechanisms which can be operated separately from the grinding machine so as to not interrupt its use.

Figure 2:
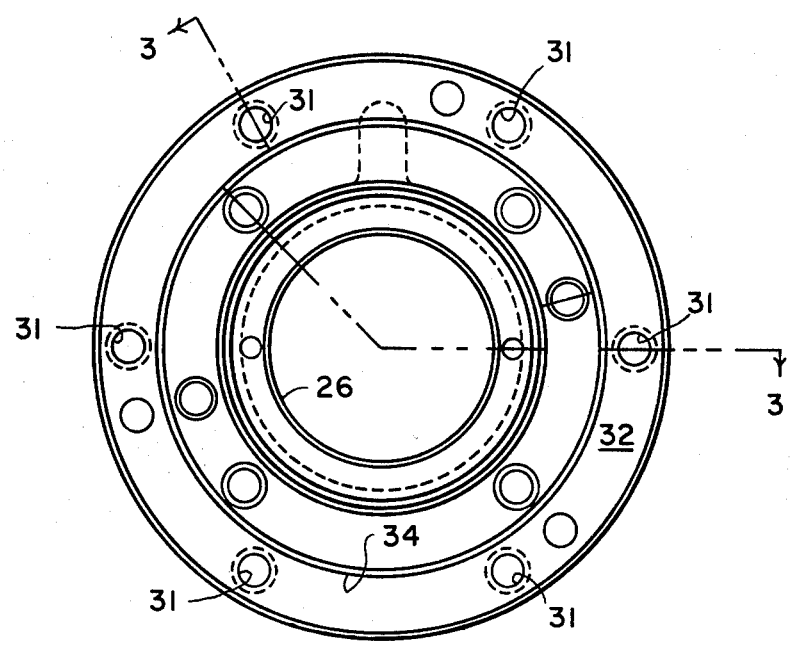
FIG. 2 is a plan view of a disc-shaped body which carries an inner stock-removing element of the tool.
Figure 3:
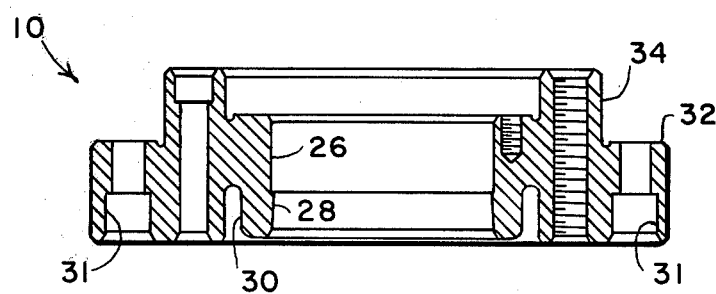
FIG. 3 is an elevational view, in section, taken on line 3—3 of FIG. 2 of the disc-shaped body of FIG. 2.

FIGS. 2 through 6 illustrate details of the components which make up the grinding wheel assembly of this invention. As shown in FIGS. 2 and 3, the first disc-shaped body 10 is generally circular in shape and includes a bore 26 through its center axis. The bore is of a diameter to receive a tool drive spindle of a gear grinding machine so that the first disc-shaped body 10 can be used as a single, separate unit if desired. Also, the bore 26 is provided with a tapered portion 28 together with an adjacent annular recess 30 for centering the disc-shaped body on a spindle in accordance with known practice. When the bore 26 is not being used for mounting the first disc-shaped body on a machine spindle, it functions to receive an extension portion of the second disc-shaped body 14 when the two bodies are assembled together into the type of assembly illustrated in FIG. 1. The first disc-shaped body is provided with a number of smaller bores 31 which are designed to receive fasteners for securing a base portion of the inner grinding element 12 against a seating surface 32. The seating surface 32 is precisely formed as part of an annular recess about the periphery of the disc-shaped body 10 so as to leave a circumferential wall 34 for resisting radially inward movement of the annular grinding element 12 during a straddle grinding operation.

Figure 4:
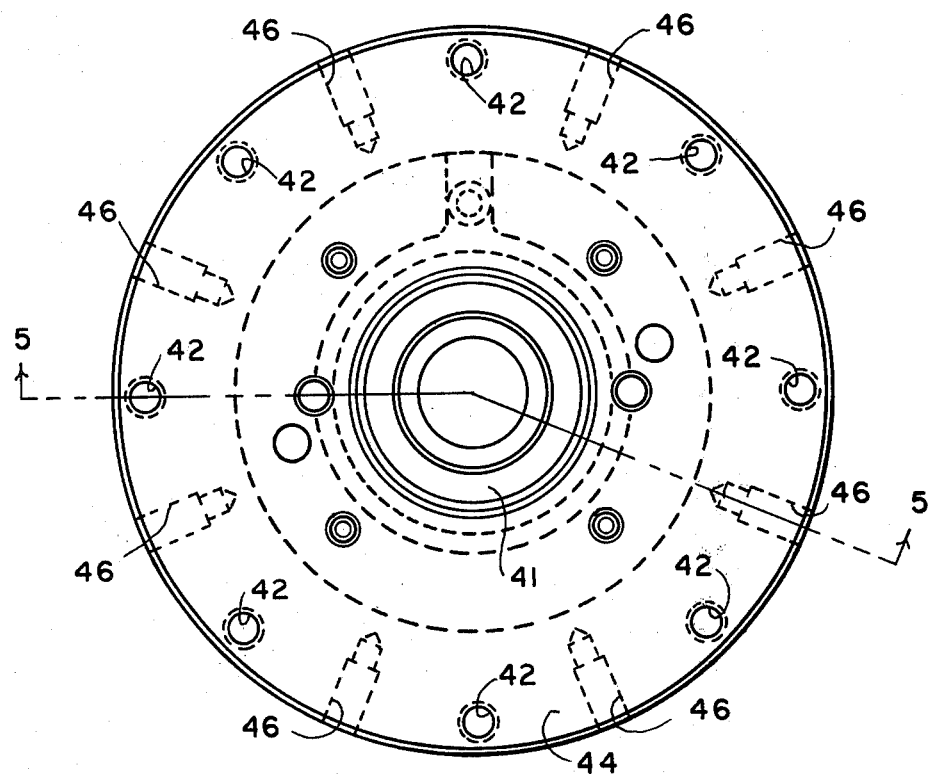
FIG. 4 is a plan view of a disc-shaped body which carries an outer stock-removing element of the tool.
Figure 5:
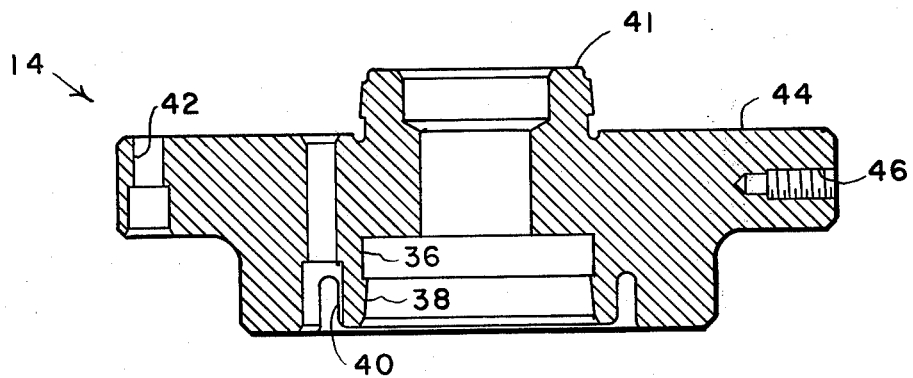
FIG. 5 is an elevational view, in section, on line 5—5 of FIG. 4 of the disc-shaped body of FIG. 4.

The second disc-shaped body 14 is illustrated in detail in FIGS. 4 and 5. This body is likewise generally circular in shape and is provided with a bore 36 of suitable diameter to be received on a drive spindle of a grinding machine. As with the first disc-shaped body, the bore 36 is provided with a tapered section 38 and an adjacent annular groove 40 for centering and securing the grinding wheel assembly to the drive spindle of a machine. One face of the disc-shaped body 14 is provided with a projecting annular sleeve 41 which is concentric with its center axis and which functions to tightly engage the bore 26 of the first disc-shaped body 10. Smaller bores 42 are provided for receiving fastener elements which secure the outer grinding element 16 to a seating surface 44 on a face of the second disc-shaped body 14. In addition, radial bores 46 are formed and provided with threads for receiving fastening elements associated with the ring member 18 of the assembly.

Figure 6:
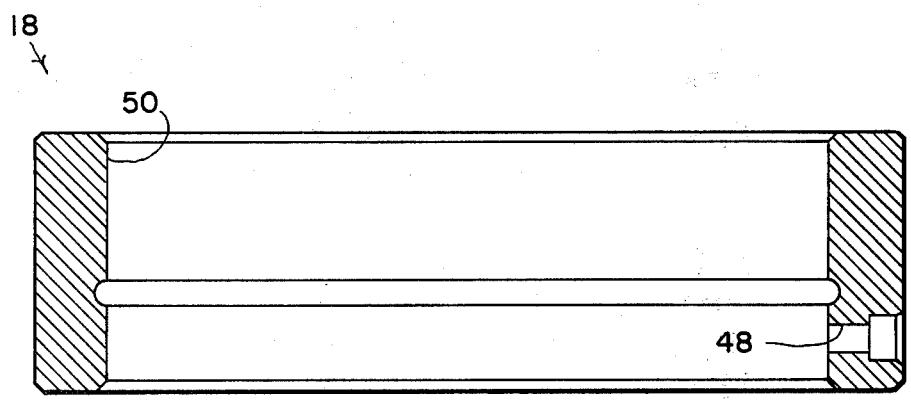
FIG. 6 is an elevational view of a ring member which contains all of the basic components of the rotary tool assembly.

As shown in FIG. 6, the ring member 18 comprises a sleeve-like structure which is designed to be compression fitted around the second disc-shaped body 14. Once the ring member is installed, there is no need for disassembling it during dressing operations, and therefore, it can be fitted onto the second disc-shaped body by compression as well as with a number of fasteners which are inserted through radial bores 48 (of the ring member) and 46 (of the second disc-shaped body 14). It can be seen that the inner circumferential wall 50 of the ring member 18 functions as a load bearing surface to resist radially outward movement of the outer grinding element 16 during a straddle grinding operation.

As an example of a rotary grinding tool manufactured in accordance with the present invention, the following specifications were used:
Material of basic components 10, 14, and 18: Steel.
Material of annular grinding elements 12 and 16:
    Brittle bronze bond of 100 grit cubic boron nitride adhered to steel ring bases.
Outside diameter of tool: 9 inches (229 mm).

Figure 7:
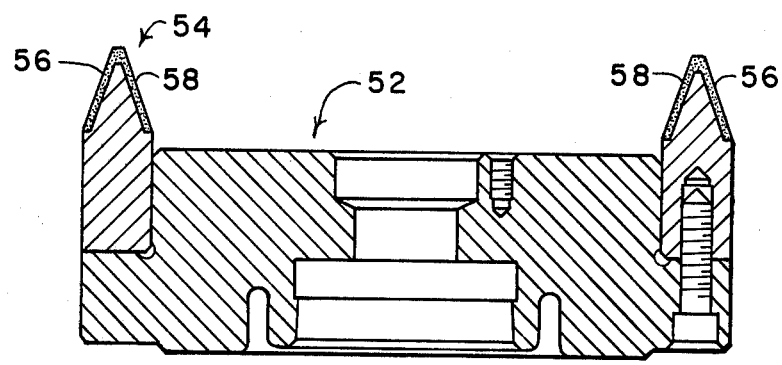
FIG. 7 is an elevational view of a modified disc-shaped body.

FIG. 7 illustrates a modified form of disc-shaped body 52 which can be substituted for the assembly shown in FIG. 1. This modified form of body is designed to receive an annular grinding element 54 which is provided with active grinding surfaces 56 and 58 for grinding both sides of a slot or groove simultaneously. Such a modified arrangement could be used, for example, to grind the grooves between gear teeth on a bevel gear pinion, and such a unit would be used by itself and without being included with a second disc-shaped body carrying a separate grinding element.

Figure 8:
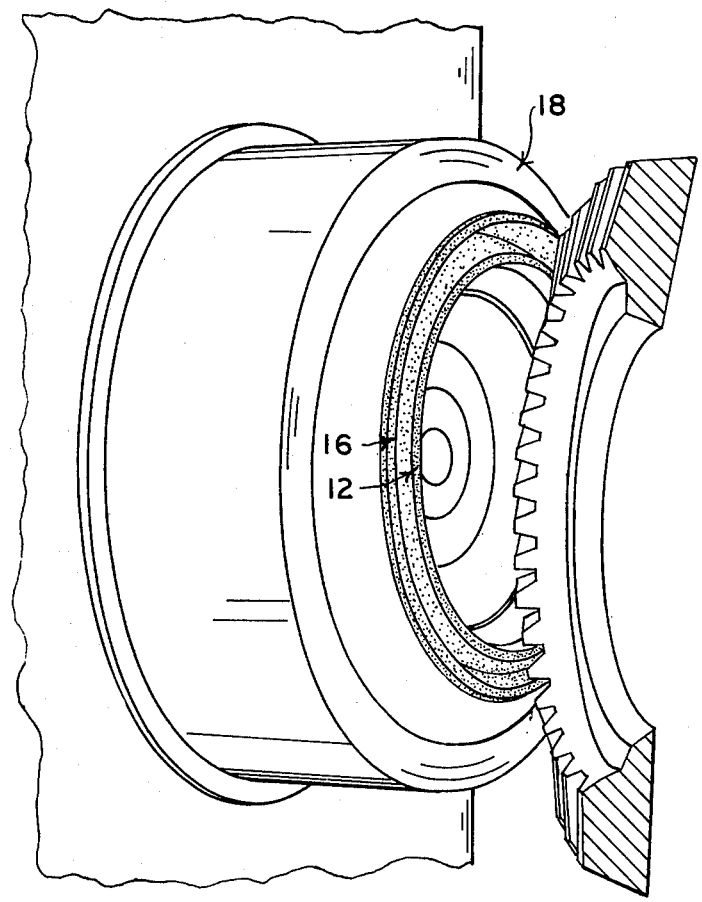
FIG. 8 is an isometric view of the assembled tool as it would appear when engaging a typical workpiece.

FIG. 8 illustrates a typical straddle grinding operation in which the grinding tool of this invention is used for forming teeth on a spiral bevel gear with a straddle grinding operation.

Although the invention has been described with reference to a single specific embodiment thereof, it can be appreciated that variations in this embodiment would be obvious to persons skilled in this art. Also, even though the invention is particularly suitable for cubic boron nitride grinding wheel compositions, it can be appreciated that the disassembly feature of the grinding wheel of this invention is useful for conventional grinding wheel compositions as well as with other superabrasives, where it is desired to provide careful renewal of active grinding surfaces which are otherwise relatively difficult to dress and renew on unitary type structures.

What is claimed is:

1. A rotary tool having two stock-removing surfaces projecting from a face thereof, said two stock-removing surfaces being arranged in side-by-side paths so that said rotary tool can be used to straddle a tooth of a gear on a workpiece to thereby form or finish said tooth, said rotary tool being characterized by an assembly of components which permits easy disassembly, renewal, and reassembly of said stock-removing surfaces, said components comprising a first disc-shaped body for carrying an inner stock-removing surface of the tool, said first disc-shaped body having a recess formed about its outer periphery for receiving a first annular element having (a) a base portion for securement in said recess and (b) a stock-removing surface which projects outwardly from the face of said first disc-shaped body, and said first disc-shaped body having a bore through its center, a second disc-shaped body for carrying an outer stock-removing surface of the tool, said second disc-shaped body having a diameter which is sufficiently larger than the diameter of said first disc-shaped body to provide an annular space between the outer circumference of said first disc-shaped body and a ring member which is carried around the circumference of said second disc-shaped body, said annular space being of a size and shape for receiving a second annular element having (a) a base portion for securement in said annular space and (b) a stock-removing surface which projects outwardly from the face of said first disc-shaped body, and said second disc-shaped body having a bore through its center, said first and second disc-shaped bodies being shaped and dimensioned to be secured together in a way which provides concentric support for said inner and outer stock-removing surfaces relative to each other, including means for aligning said bores of said first and second disc-shaped bodies, and a ring member for containing said second disc-shaped body and for supporting said second annular element.

2. The rotary tool of claim 1 wherein said stock-removing surfaces comprise annular grinding elements.

3. The rotary tool of claim 1 wherein means for aligning said bores of said first and second disc-shaped bodies includes a tapered section in said bore of said first disc-shaped body for aligning said first disc-shaped body with a part of said second disc-shaped body which fits into said bore, so that said two bodies are concentrically aligned with one another.

4. The rotary tool of claim 3 wherein said second disc-shaped body includes a projecting annular sleeve concentric with its center axis for being received into the tapered section of the bore of said first disc-shaped body.

5. The rotary tool of claim 4 wherein said second disc-shaped body includes a tapered section in its bore for aligning said second disc-shaped body with a tool drive spindle of a grinding machine.

6. The rotary tool of claim 5 wherein portions of said bores of said first and second disc-shaped bodies are of an equal size so that either disc-shaped body can be mounted on a tool drive spindle of a grinding machine.

* * * * *